US011235716B2

(12) United States Patent
Yoo et al.

(10) Patent No.: US 11,235,716 B2
(45) Date of Patent: Feb. 1, 2022

(54) MOVEABLE SEAT CONTROL APPARATUS WITH AUTOMATICALLY CHARGEABLE BATTERY

(71) Applicants: Hyundai Motor Company, Seoul (KR); Kia Motors Corporation, Seoul (KR); Daechang Seat Co., Ltd-Dongtan, Hwaseong-si (KR)

(72) Inventors: So Young Yoo, Suwon-si (KR); Hyo Cheol Kang, Hwaseong-si (KR); Doo Ri Kim, Goyang-si (KR); Hyung Jin Park, Anyang-si (KR); Yo Han Kim, Ansan-si (KR); Sung Hyun Hwang, Goyang-si (KR); Seon Chae Na, Yongin-si (KR); Sang Uk Yu, Seoul (KR); Dong Hoon Lee, Seoul (KR); Byung Yong Choi, Hwaseong-si (KR); Sang Young Park, Hwaseong-si (KR); Tae Hong Han, Seoul (KR)

(73) Assignees: Hyundai Motor Company, Seoul (KR); Kia Motors Corporation, Seoul (KR); Daechang Seat Co., Ltd-Dongtan, Hwaseong-si (KR)

( * ) Notice: Subject to any disclaimer, the term of this patent is extended or adjusted under 35 U.S.C. 154(b) by 0 days.

(21) Appl. No.: 16/997,488

(22) Filed: Aug. 19, 2020

(65) Prior Publication Data

US 2021/0178990 A1    Jun. 17, 2021

(30) Foreign Application Priority Data

Dec. 13, 2019    (KR) ........................ 10-2019-0167278

(51) Int. Cl.
*B60N 2/06*    (2006.01)
*B60N 2/07*    (2006.01)
(Continued)

(52) U.S. Cl.
CPC .......... *B60R 16/027* (2013.01); *B60N 2/0232* (2013.01); *B60N 2/0244* (2013.01);
(Continued)

(58) Field of Classification Search
CPC .. B60R 16/027; B60N 2/0232; B60N 2/0244; B60N 2/5621; B60N 2/5678; B60N 2/66
(Continued)

(56) References Cited

U.S. PATENT DOCUMENTS 5,944,131 A * 8/1999 Schaffner ............... A61G 5/043
                                                      180/65.1
6,105,706 A * 8/2000 Cooper .................... A61G 5/06
                                                      297/344.11 X (Continued)

FOREIGN PATENT DOCUMENTS

| EP | 3 546 280 A1 | 10/2019 |
|---|---|---|
| JP | 2010105527 A | 5/2010 |
| KR | 101518647 B1 | 5/2015 |
| KR | 20150130542 A | 11/2015 |
| KR | 20160043303 A | 4/2016 |
| WO | WO 2018/221977 A1 | 12/2018 |

OTHER PUBLICATIONS

Extended European Search Report dated Mar. 2, 2021 for European Patent Application No. 20191762.2.

*Primary Examiner* — Rodney B White
(74) *Attorney, Agent, or Firm* — Morgan, Lewis & Bockius LLP

(57) ABSTRACT

A moveable seat control apparatus with an automatically chargeable battery, may include a seat including a moving motor engaged to the seat and configured to selectively move the seat along a rail, a battery positioned below the seat, and configured to receive power to perform charge, and to supply the charged power, a controller positioned below the seat and connected to the battery, and configured to monitor a state of charge (SOC) value of the battery to generate SOC information, and to control the moving motor (Continued)

to move the seat to a charge position when the SOC is equal to or less than a predetermined SOC, and a charger connected to the battery and coupled to a power supply terminal to receive the power and to charge the battery.

20 Claims, 18 Drawing Sheets

(51) Int. Cl.
    *B60R 16/027*      (2006.01)
    *B60N 2/02*      (2006.01)
    *B60N 2/56*      (2006.01)
    *B60N 2/66*      (2006.01)

(52) U.S. Cl.
    CPC ......... *B60N 2/5621* (2013.01); *B60N 2/5678* (2013.01); *B60N 2/66* (2013.01)

(58) Field of Classification Search
    USPC .................................................. 297/344.11
    See application file for complete search history.

(56) References Cited

U.S. PATENT DOCUMENTS

| | | | |
|---|---|---|---|
| 7,207,403 B2* | 4/2007 | Grymko | A61G 5/0891 |
| | | | 180/65.1 |
| 7,614,699 B2* | 11/2009 | Torres | A61G 5/045 |
| | | | 297/344.14 |
| 10,836,332 B2 | 11/2020 | Yamamoto et al. | |
| 10,926,668 B2 | 2/2021 | Line et al. | |
| 2011/0162896 A1* | 7/2011 | Gillett | B60L 8/006 |
| | | | 180/2.2 |
| 2016/0031507 A1* | 2/2016 | Neugebauer | B60L 15/20 |
| | | | 180/206.1 |
| 2019/0260238 A1 | 8/2019 | Cho et al. | |
| 2019/0299817 A1 | 10/2019 | Faltin | |
| 2020/0016997 A1* | 1/2020 | Sato | G08G 1/20 |
| 2020/0189511 A1 | 6/2020 | Ricart et al. | |
| 2020/0290534 A1 | 9/2020 | Hemmelgarn et al. | |
| 2021/0178990 A1 | 6/2021 | Yoo et al. | |

* cited by examiner

MOVEABLE SEAT CONTROL APPARATUS WITH AUTOMATICALLY CHARGEABLE BATTERY

CROSS-REFERENCE TO RELATED APPLICATION

The present application claims priority to Korean Patent Application No. 10-2019-0167278, filed on Dec. 13, 2019 in the Korean Intellectual Property Office, the entire contents of which is incorporated herein for all purposes by this reference.

BACKGROUND OF THE PRESENT INVENTION

Field of the Invention

The present invention relates to a control apparatus of a moveable seat to enhance the utilization of an indoor space, and more particularly, to a moveable seat control apparatus with an automatically chargeable battery including a seat, a battery, a controller, and a charger to enhance space utilization while ensuring seat mobility and configured to automatically move a seat to a charge position and to charge the battery when a state of charge (SOC) value of the battery is equal to or less than a predetermined level.

Description of Related Art

Currently, electronic devices for embodying numerous seat functions (seat movement, hot wire, ventilation, lumbar, bolster, massage, vibration, media, etc.) that require power have been applied to a vehicle seat.

As technologies have been gradually developed, electronic devices such as relatively many safety devices and health care devices have been applied.

However, conventionally, a method of supplying power to a seat using a wire harness as a connector is used to supply power to electronic devices for embodying a seat function, but when the method is used, there is a limit in seat mobility and in that wiring is exposed without change during set movement.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a mobile seat control technology for automatically charging a battery for moving a seat to a charge position when a state of charge (SOC) value of the battery is equal to or less than a predetermined reference by positioning the battery and a controller inside the seat to be moved to the charge position to enhance space utilization inside a vehicle through extension (EX. swivel or long rail) of a region for moving the seat in an autonomous driving environment and to provide a convenience function (health care, an electronic device, or the like) dependent upon the seat through the battery included in the seat itself instead of connection of a wiring harness connector with the battery positioned inside the vehicle or a wireless power transmission and reception method.

In accordance with an aspect of the present invention, the above and other objects may be accomplished by the provision of a moveable seat control apparatus with an automatically chargeable battery, including a seat having a moving motor engaged to the seat and configured to selectively move the seat along a rail, a battery positioned below the seat, and configured to receive power to perform charge, and to supply the charged power, a controller positioned below the seat and connected to the battery, and configured to monitor a state of charge (SOC) value of the battery to generate SOC information, and to control the moving motor to move the seat to a charge position when the state of charge (SOC) is equal to or less than a predetermined SOC, and a charger connected to the battery and coupled to a power supply terminal to receive the power and to charge the battery.

According to an exemplary embodiment of the present invention, the controller may be configured to control at least one seat function of a power seat, a lumbar, a ventilation device, or a heater.

According to an exemplary embodiment of the present invention, the controller may be configured to determine that a current state is a state in which a seat function is configured for being provided and may provide at least one seat function of the power seat, the lumbar, the ventilation device, or the heater when the monitored SOC value is equal to or greater than a predetermined reference.

According to an exemplary embodiment of the present invention, the controller and the battery may be configured as one integrated module mounted below a cushion frame of the seat.

According to an exemplary embodiment of the present invention, the integrated module may include a module cover, a battery cover, the battery, a printed circuit board (PCB) circuit, and at least one connector.

According to an exemplary embodiment of the present invention, the PCB circuit may integrally control the seat function and monitors capacity of the battery to determine whether to charge or use the battery.

According to an exemplary embodiment of the present invention, the at least one connector may be connected to the charger to receive the power and to supply current required for a seat function operation and may be connected to input or output a control signal of an electronic device function of the seat.

According to an exemplary embodiment of the present invention, the integrated module may be positioned in an available space below a seat cushion, positioned below a cushion frame of the seat and above a floor of a vehicle body.

According to an exemplary embodiment of the present invention, the integrated module may be mounted in the available space below the seat cushion using an Integrated Memory System (IMS) controller mounting bracket.

According to an exemplary embodiment of the present invention, the charger may include a charge module and a vehicle signal transmission and reception module and provides a charge function and a vehicle signal transmission and reception function.

According to an exemplary embodiment of the present invention, the charger may use a 4-pin POGO Pin to be coupled to a current supply terminal and to receive current.

According to an exemplary embodiment of the present invention, the charger may supply current to the battery through a 4-Pin POGO Pin connected to a current supply terminal connected to a battery inside a vehicle.

According to an exemplary embodiment of the present invention, the controller may be configured to control supply of power required for operation of at least a seat function.

According to an exemplary embodiment of the present invention, the 4-pin POGO Pin may include a POGO Pin male, a POGO Pin female, and a POGO bracket.

According to an exemplary embodiment of the present invention, the moveable seat control apparatus may further include an emergency charge structure using a cigar jack to move the seat to a charge position when the battery is at least fully discharged.

According to an exemplary embodiment of the present invention, power may be supplied to the battery by connecting the battery to a power supply terminal connected to the battery inside the vehicle through a cigar jack.

According to an exemplary embodiment of the present invention, the moveable seat control apparatus may further include a charge return switch configured to manipulate a switch irrespective of the state of charge (SOC) of the battery and to control the moving motor to move the seat to a charge position.

According to an exemplary embodiment of the present invention, when current is supplied to the battery through the cigar jack, charge through a POGO Pin may be stopped.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
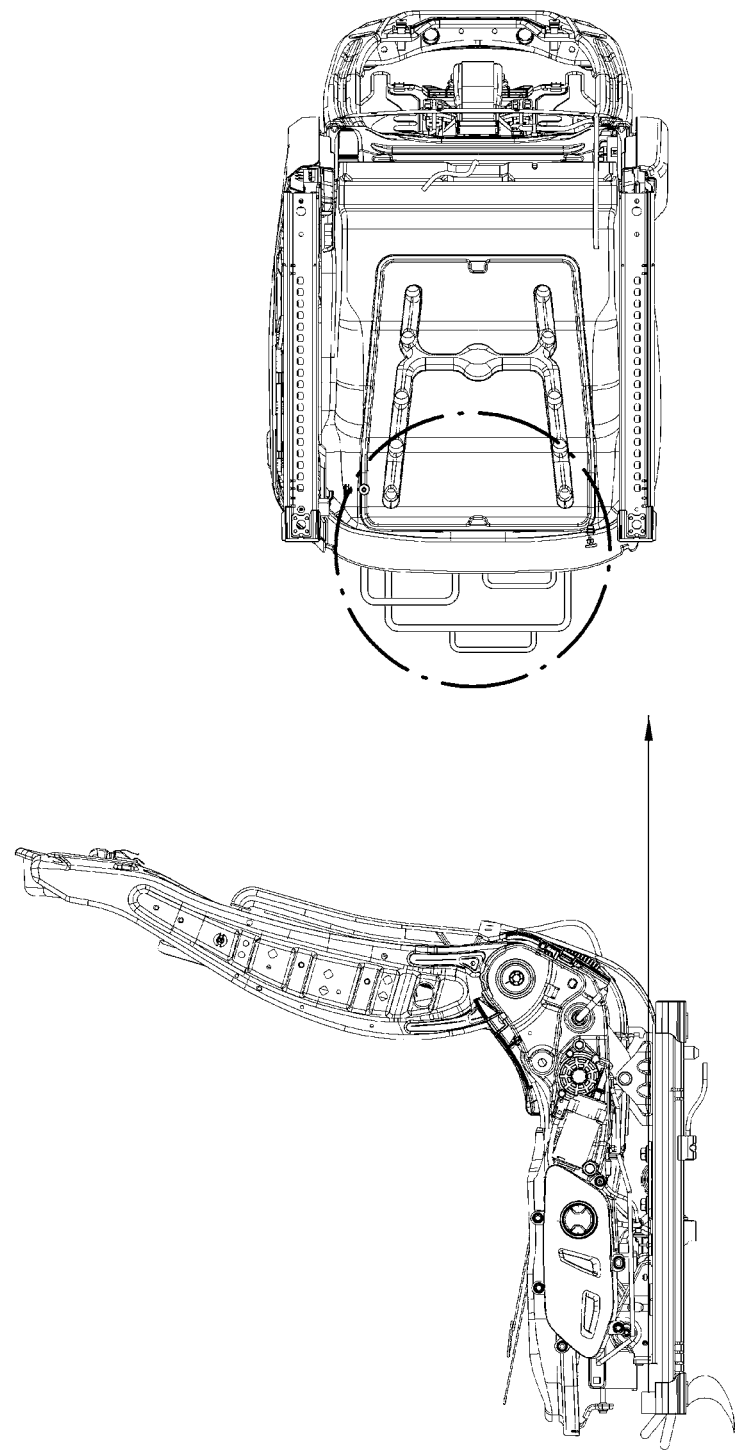
FIG. 1 is a diagram illustrating a conventional moveable seat.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present invention are described in detail for those of ordinary skill in the art to easily implement the present invention with reference to the accompanying drawings. However, the present invention may be implemented in various different forms and is not limited to these embodiments.

To clearly describe the present invention, a portion without concerning to the description is omitted in the drawings, and like reference numerals in the specification denote like elements.

In the specification, when a certain portion "includes" a certain component, this indicates that the portion may further include another component instead of excluding another component unless there is no different disclosure.

Hereinafter, a moveable seat control apparatus with an automatically chargeable battery according to an exemplary embodiment of the present invention will be described.

FIG. 1 is a diagram illustrating a conventional moveable seat.

FIG. 1 illustrates the conventional moveable seat, in which case there is a limit in the mobility of the seat due to a structure for supplying power through wire harness connection and in that wirings are exposed without changes during movement.

Figure 2:
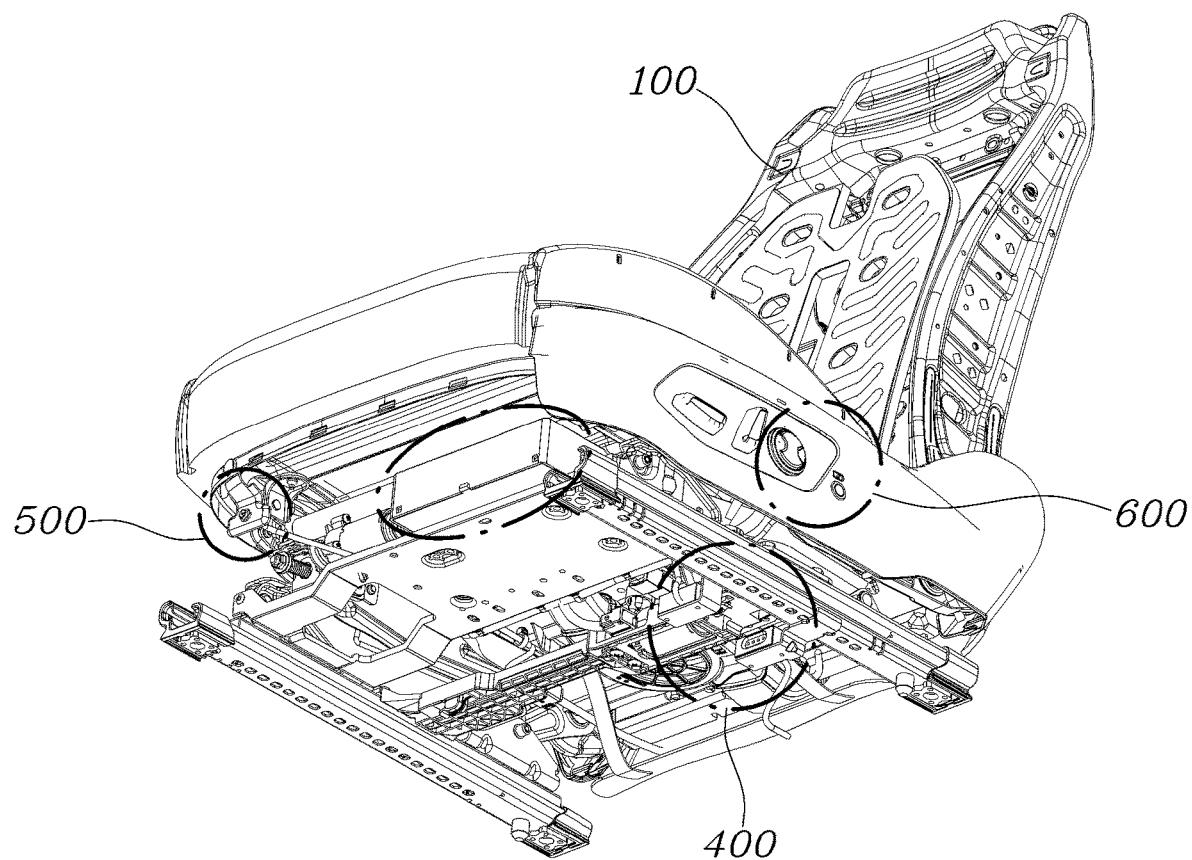
FIG. 2 is a diagram illustrating the configuration of a moveable seat control apparatus with an automatically chargeable battery according to an exemplary embodiment of the present invention.

FIG. 2 is a diagram illustrating the configuration of a moveable seat control apparatus with an automatically chargeable battery according to an exemplary embodiment of the present invention.

FIG. 2 illustrates the configuration of the moveable seat control apparatus with an automatically chargeable battery according to an exemplary embodiment of the present invention and the moveable seat control apparatus may include a seat 100, a battery 200, a controller 300, and a charger 400.

The seat 100 may include a moving motor 110 for moving the seat 100 along a rail.

The seat 100 according to an exemplary embodiment of the present invention is not limited to a specific shape and material, and any seat may be used without being limited as long as the seat is moveable to a chargeable position through control of the moving motor 110.

The battery 200 may be positioned below the seat, may receive power to be charged, and may supply the charged power.

The battery 200 according to an exemplary embodiment of the present invention may be included in the seat without being connected to a separate external power source to independently move the seat if necessary and may supply power required to provide various seat functions disposed in the seat.

The controller 300 may be positioned below the seat, may monitor a state of charge (SOC) value of the battery 200 to generate SOC information, and may control movement of the moving motor to move the seat to a charge position when the SOC is equal to or less than a predetermined SOC, movement of the moving motor may be controlled to move the seat to a charge position.

According to an exemplary embodiment of the present invention, at least one of seat functions including a power seat, a lumbar, a ventilation device, or a heater may be controlled.

According to the exemplary embodiment of the present invention, the controller 300 may perform control to supply power required for an operation to a corresponding function unit to perform the seat function from the battery 200.

According to an exemplary embodiment of the present invention, when state of charge (SOC) information is equal to or greater than a predetermined reference, the controller 300 may determine that the current state is a state in which a seat function is to be provided and may provide at least one seat function of a power seat, a lumbar, a ventilation device, or a heater.

The charger 400 may be connected to the battery 200, may be coupled to an external power supply terminal to receive the power, and may charge a battery.

According to an exemplary embodiment of the present invention, the charger 400 may have a structure to be coupled to an external power supply terminal, may receive power through the external power supply terminal, and may transmit the received power to the battery 200 to charge the battery 200.

Figure 3:
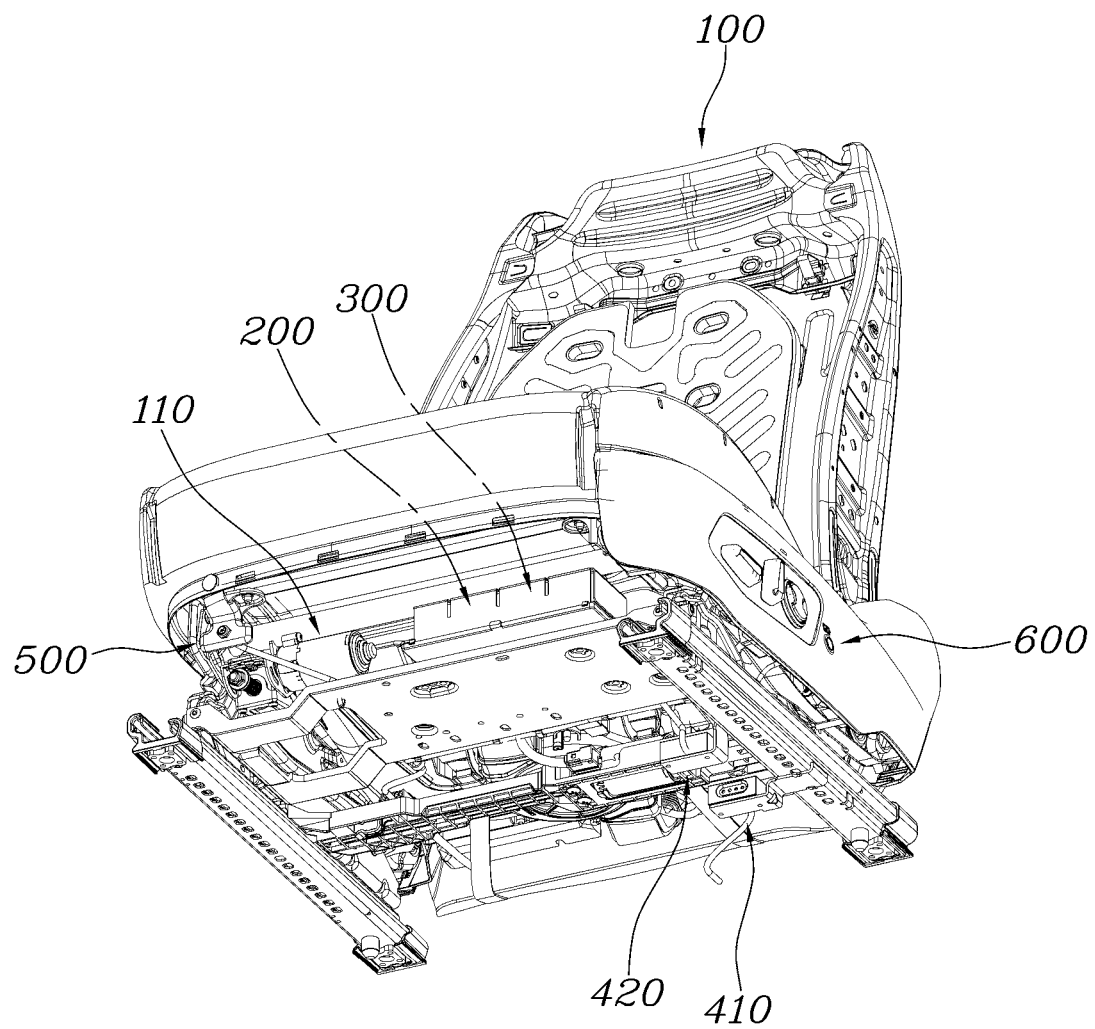
FIG. 3 is a diagram illustrating a detailed configuration of a moveable seat control apparatus with an automatically chargeable battery according to an exemplary embodiment of the present invention.

FIG. 3 is a diagram illustrating a detailed configuration of a moveable seat control apparatus with an automatically chargeable battery according to an exemplary embodiment of the present invention.

Referring to FIG. 3, the moveable seat control apparatus with an automatically chargeable battery according to an exemplary embodiment of the present invention may include sub-components.

According to an exemplary embodiment of the present invention, the battery 200 may be included in the seat, and the controller 300 for controlling the battery 200 may also be positioned in the seat.

According to an exemplary embodiment of the present invention the battery 200 and the controller 300 may be configured into one integrated module mounted below a cushion frame of the seat.

According to an exemplary embodiment of the present invention, the battery 200 may include a plurality of cells, and the controller 300 may monitor capacity of each cell of the battery 200 to generate state of charge (SOC) information, and may control charge and discharge of the battery 200 based on the generated SOC information.

According to an exemplary embodiment of the present invention, the controller 300 may control an operation of the moving motor 110 to move the seat and may supply power for performing various seat functions including a power seat, a lumbar, a ventilation device, and a heater.

According to an exemplary embodiment of the present invention, when the SOC value is equal to or greater than a predetermined reference, it may be determined that the current is a state in which a seat function is configured for being provided, and at least one seat function of a power seat, a lumbar, a ventilation device, or a heater may be provided.

According to an exemplary embodiment of the present invention, the controller 300 may control a battery to supply power required to perform a seat function to the seat.

According to an exemplary embodiment of the present invention, the charger 400 may use the POGO pin which is a contact-type connector for charge, and according to an exemplary embodiment of the present invention, may use the 4-pin POGO pin.

The moveable seat control apparatus according to an exemplary embodiment of the present invention may include a charge return switch for receiving power of a vehicle battery and configured to move the seat to a charge position.

The moveable seat control apparatus according to an exemplary embodiment of the present invention may further include an emergency charge structure 500 for moving the seat to a charge position using a cigar jack even if the battery is fully discharged to prepare for a situation which the seat is not configured for being moved when the seat battery is discharged, and thus, may connect a separate cable to the cigar jack of a vehicle to receive emergency power.

According to an exemplary embodiment of the present invention, the charger 400 may include a charge module 410 and a vehicle signal transmission and reception module 420 for providing a function of transmitting and receiving a vehicle signal.

According to an exemplary embodiment of the present invention, the charger 400 may include the vehicle signal transmission and reception module 420 for providing the function of transmitting and receiving a vehicle signal, for receiving a control signal for controlling a seat function input by a user, as well as the charge module 410 for providing a charge function.

Figure 4:
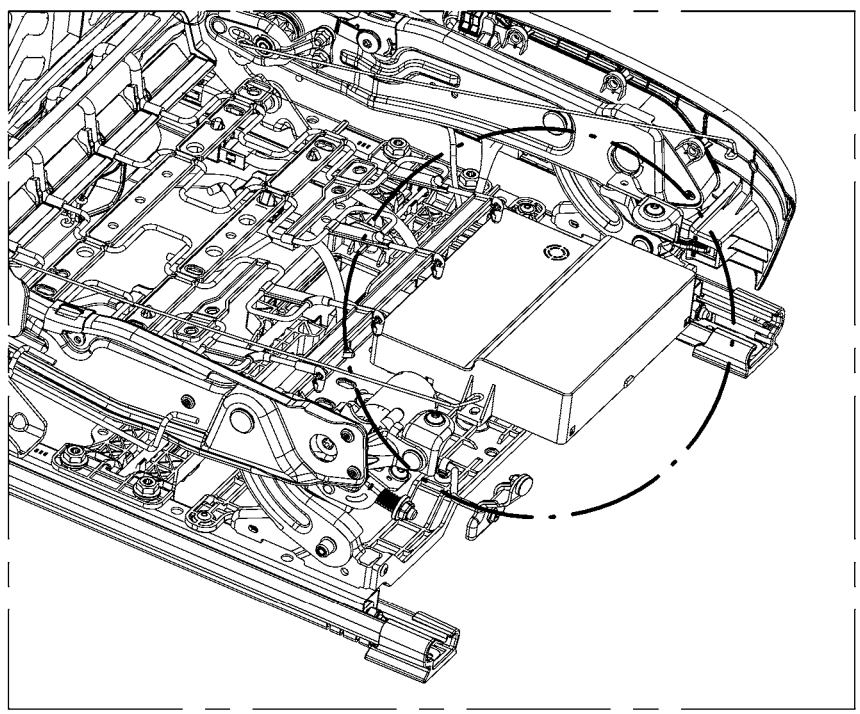
FIG. 4 is a diagram illustrating an integrated module configured by integrating a controller and a battery into one integrated module according to an exemplary embodiment of the present invention.

FIG. 4 is a diagram illustrating an integrated module configured by integrating a controller and a battery into one integrated module according to an exemplary embodiment of the present invention.

According to an exemplary embodiment of the present invention, the integrated module may be positioned in a form of a box case below a cushion frame below the seat 100.

According to an exemplary embodiment of the present invention, power may be supplied through the battery 200 included in the seat, and thus a seat function including seat movement, a lumbar, a ventilation device, a heater, or the like may be embodied.

Figure 5:
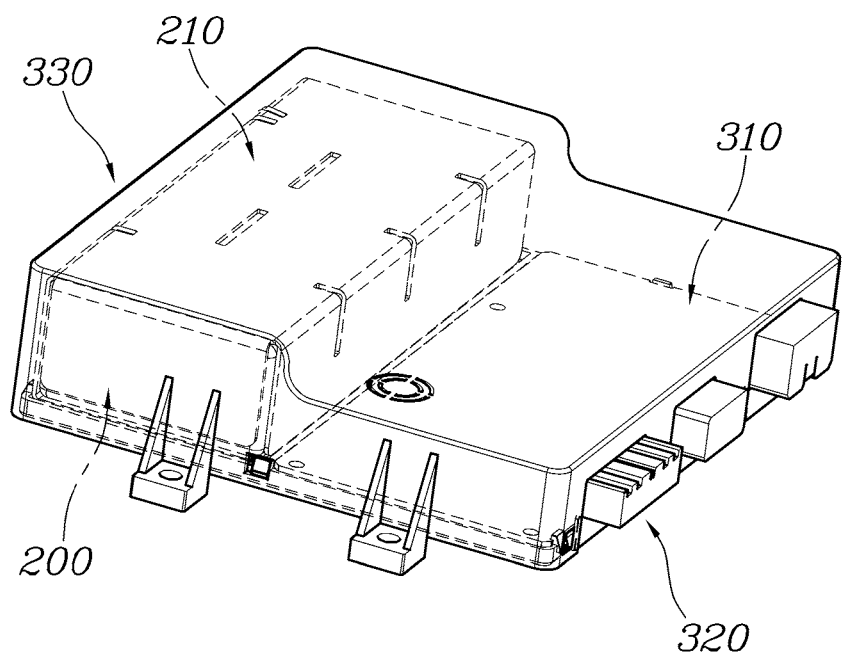
FIG. 5 is a diagram illustrating a detailed configuration of the integrated module of FIG. 4.

FIG. 5 is a diagram illustrating a detailed configuration of the integrated module of FIG. 4.

FIG. 5 illustrates the detailed configuration of the integrated module, and the integrated module may include a module cover 330 to which a seat mounting structure is applied, a battery cover 210, the battery 200, a printed circuit board (PCB) circuit 310, and at least one connector 320.

According to an exemplary embodiment of the present invention, the battery 200 may receive power from an external battery or a battery mounted in a vehicle and may charge the battery 200.

According to an exemplary embodiment of the present invention, the PCB circuit 310 may integrally control seat functions and may monitor battery capacity to determine charge or use.

According to an exemplary embodiment of the present invention, the PCB circuit 310 may perform a function of integrally performing seat functions through an electronic device and a function of monitoring cell capacity of the battery 200 and controlling charge and discharge of the battery 200.

According to an exemplary embodiment of the present invention, the battery 200 may use a lithium polymer battery which is a secondary battery, and capacity of the battery 200 may be selected in consideration of power of an electronic device configured for performing seat functions.

According to an exemplary embodiment of the present invention, the battery cover 210 may be a cover formed of a steel material for protecting the battery 200 from external shocks, providing a heat dissipation effect for discharging heat of a battery.

According to an exemplary embodiment of the present invention, the connector 320 may be connected to the charger to receive current and to supply current required for a seat function operation and may be connected to the charger to input and output a control signal of a function of an electronic device of the seat.

According to an exemplary embodiment of the present invention, the integrated module may include at least one connector, and according to an exemplary embodiment of the present invention, as shown in FIG. 5, the integrated module may include three connectors 320, and thus may be connected to input or output power and a control signal through the connectors 320.

Figure 6:
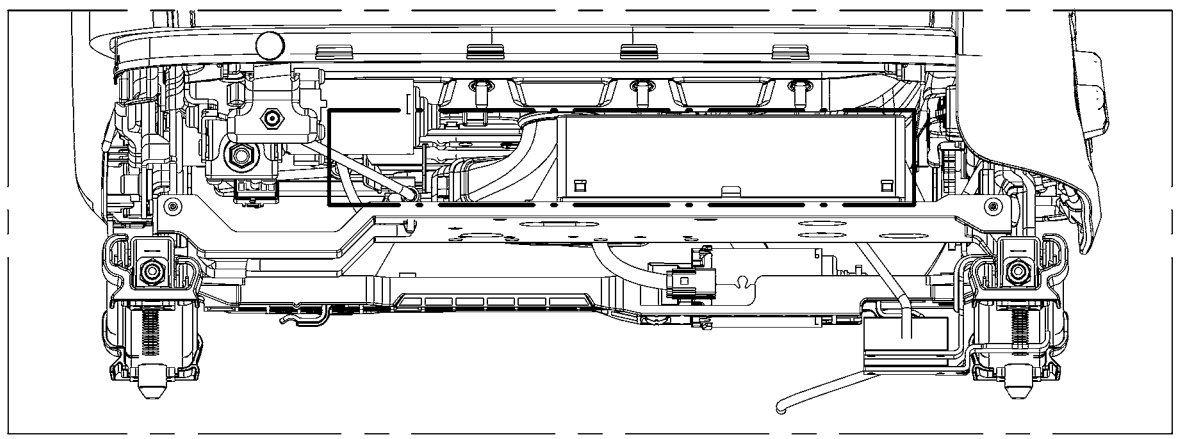
FIG. 6 is a diagram illustrating a position of an integrated module according to an exemplary embodiment of the present invention.

FIG. 6 is a diagram illustrating a position of an integrated module according to an exemplary embodiment of the present invention.

According to an exemplary embodiment of the present invention, as shown in FIG. 6, the integrated module may be positioned in an available space below a seat cushion, positioned below a cushion frame of the seat and above a floor of a vehicle body.

According to an exemplary embodiment of the present invention, the integrated module may be mounted in an available space below the seat cushion using an Integrated Memory System (IMS) controller mounting bracket to position the integrated module in the available space below the seat cushion.

Figure 7:
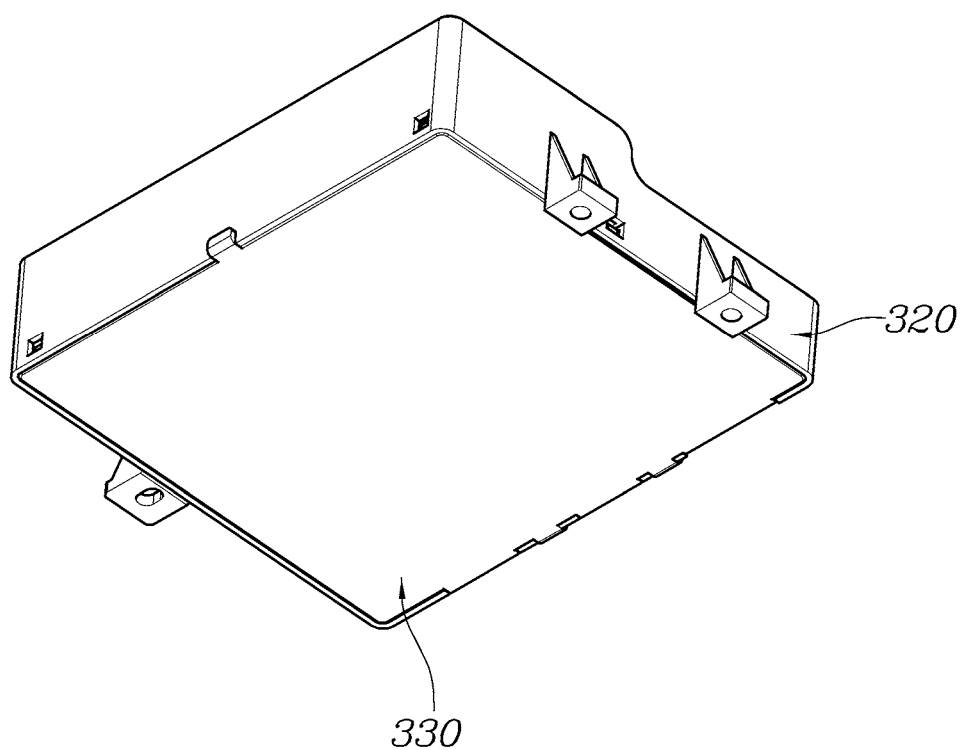
FIG. 7 is a diagram illustrating an external appearance of an integrated module according to an exemplary embodiment of the present invention.

FIG. 7 is a diagram illustrating an external appearance of an integrated module according to an exemplary embodiment of the present invention.

Referring to FIG. 7, the integrated module according to an exemplary embodiment of the present invention may be configured in a form of a case by coupling upper and lower module covers.

Figure 8:
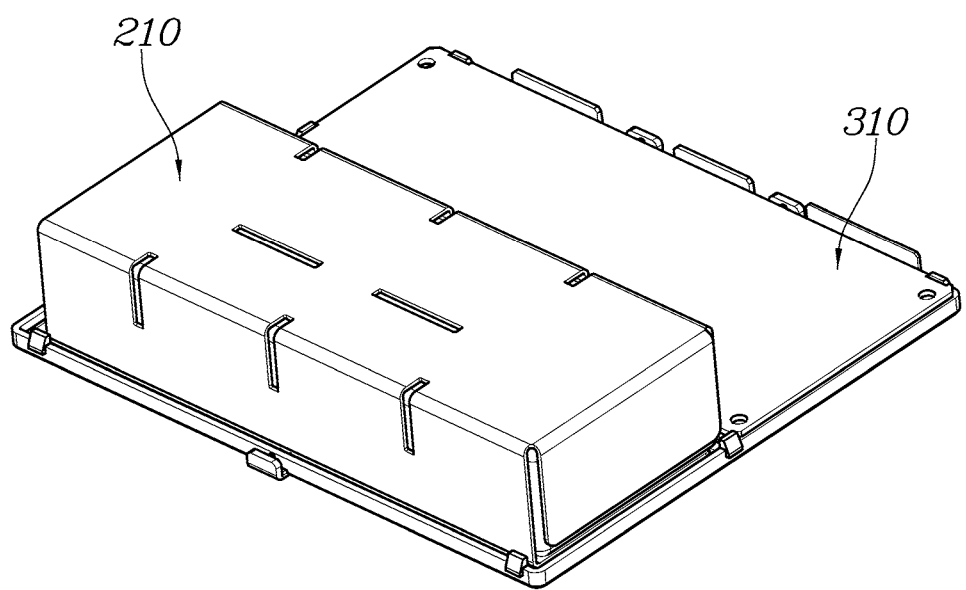
FIG. 8 is a diagram illustrating an internal portion of an integrated module according to an exemplary embodiment of the present invention.

FIG. 8 is a diagram illustrating an internal portion of an integrated module according to an exemplary embodiment of the present invention.

Referring to FIG. 8, the battery 200 and the PCB circuit 310 for performing a function of the controller 300 may be positioned within the integrated module according to an exemplary embodiment of the present invention, and the battery 200 may be protected by the battery cover 210 to prevent a clearance and to dissipate heat inside the battery.

Figure 9:
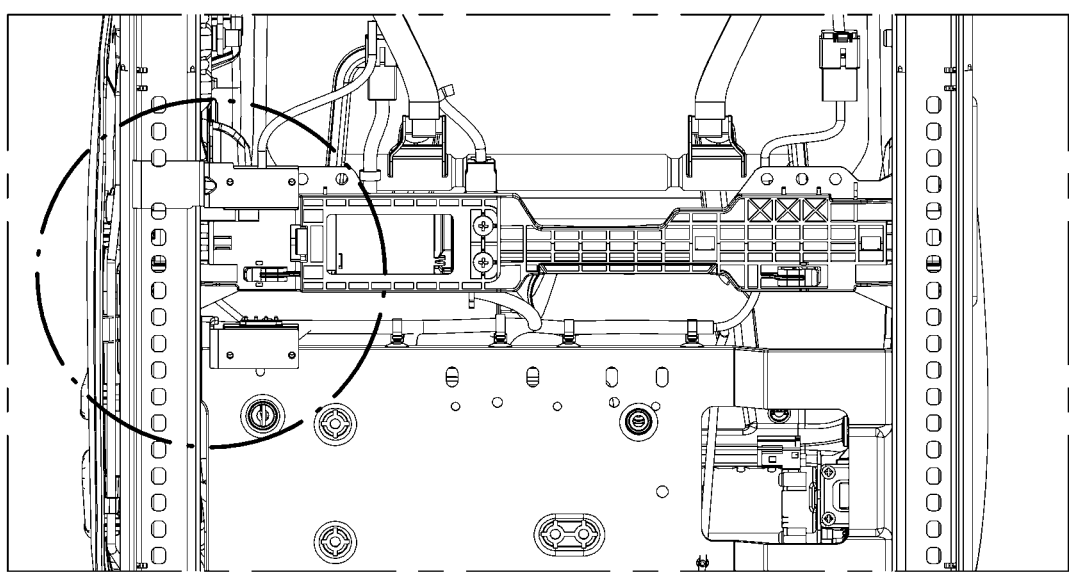
FIG. 9 is a diagram illustrating a detailed configuration of the charger illustrated in FIG. 2.

FIG. 9 is a diagram illustrating a detailed configuration of the charger illustrated in FIG. 2.

Referring to FIG. 9, the charger 400 according to an exemplary embodiment of the present invention may include a charge module and a vehicle signal transmission and reception module to provide a charge function and a vehicle signal transmission and reception function.

According to an exemplary embodiment of the present invention, the charger 400 may use the 4-pin POGO pin to be coupled to a current supply terminal and to receive current.

According to an exemplary embodiment of the present invention, the charger 400 may supply current to the battery through the 4-pin POGO pin connected to the current supply terminal connected to a battery inside a vehicle.

Figure 10:
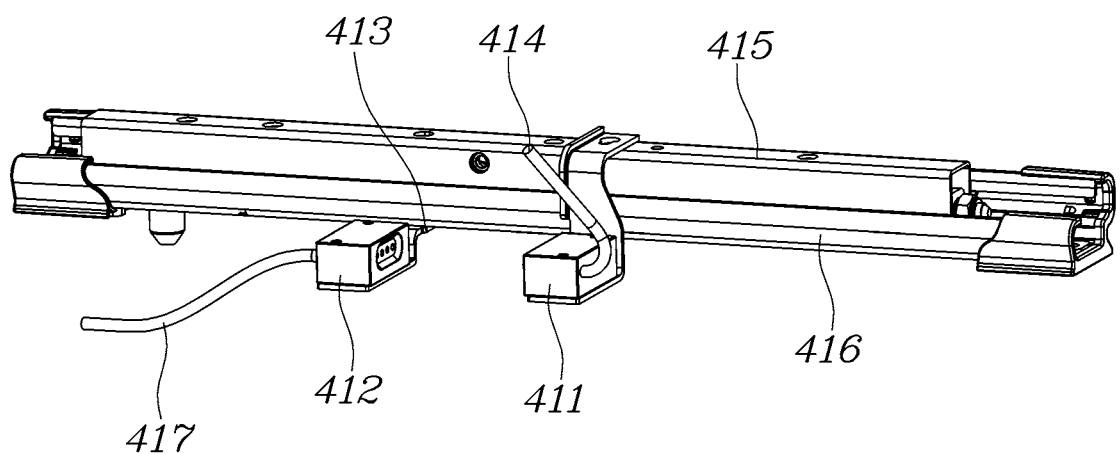
FIG. 10 is a diagram illustrating the configuration of a POGO pin according to an exemplary embodiment of the present invention.

FIG. 10 is a diagram illustrating the configuration of a POGO pin according to an exemplary embodiment of the present invention.

Referring to FIG. 10, the 4-pin POGO pin according to an exemplary embodiment of the present invention may include a POGO pin male 411, a POGO pin female 412, and POGO brackets 413 and 414 to connect power from a battery of a vehicle to a battery inside the seat.

According to an exemplary embodiment of the present invention, the POGO pin may transmit and receive other input signals of the vehicle as well as may connect power of the battery of the vehicle and may also transmit and receive an IG3 signal of the vehicle in an environment in which the IG3 signal is used.

According to an exemplary embodiment of the present invention, a bracket on which the POGO pin male 411 is mounted may be mounted on an upper rail 415 of a track, and a bracket on which the POGO pin female 412 is mounted may be mounted on a lower rail 416 of the track.

According to an exemplary embodiment of the present invention, a wire harness 417 connected to the POGO pin female 412 may be connected to a battery of a vehicle, and an opposite side of the wire harness may be connected to the integrated module.

Figure 11:
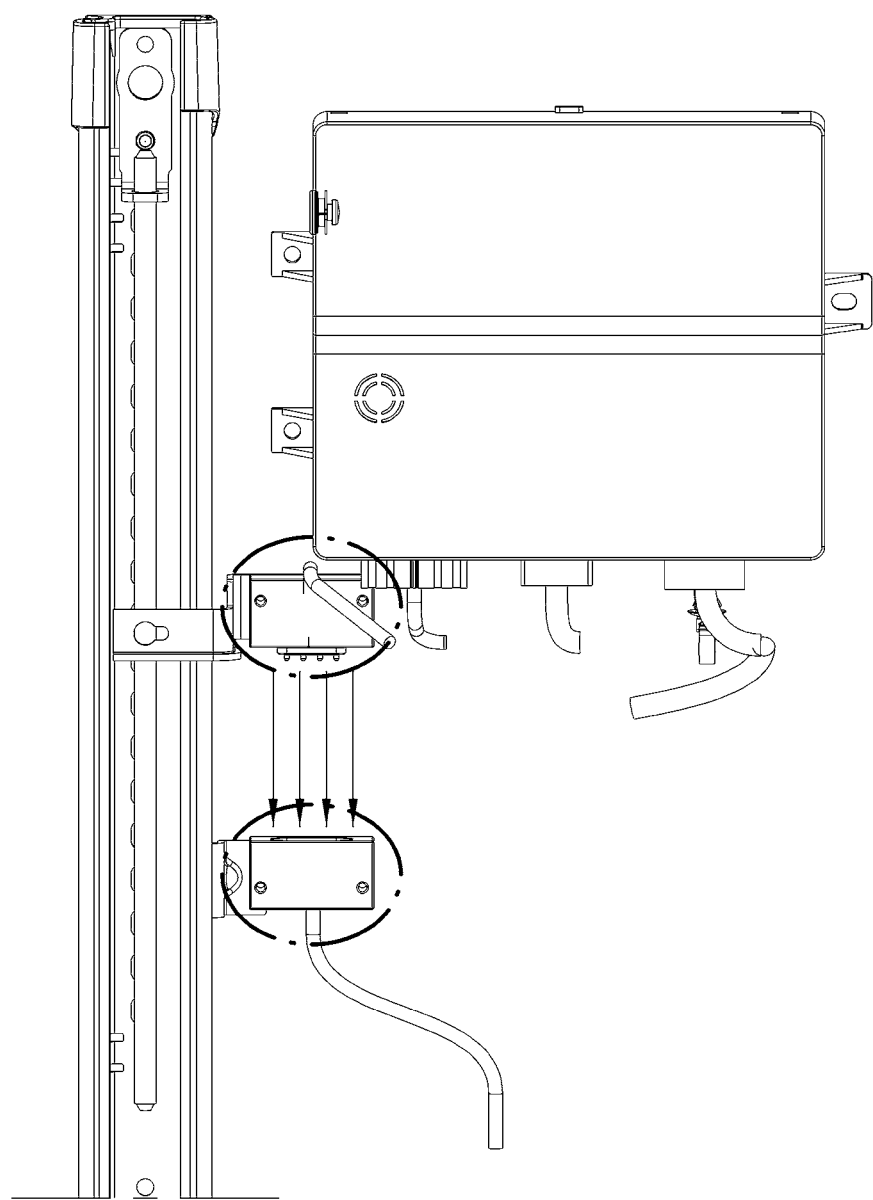
FIG. 11 is a diagram illustrating connection for current supply through the POGO Pin according to an exemplary embodiment of the present invention.

FIG. 11 is a diagram illustrating connection for current supply through the POGO Pin according to an exemplary embodiment of the present invention.

Referring to FIG. 11, when a seat is moved to a charge position through seat sliding using the POGO Pin according to an exemplary embodiment of the present invention, POGO Pins positioned on a floor of a vehicle body and a lower track may be connected to supply power.

Figure 12A:
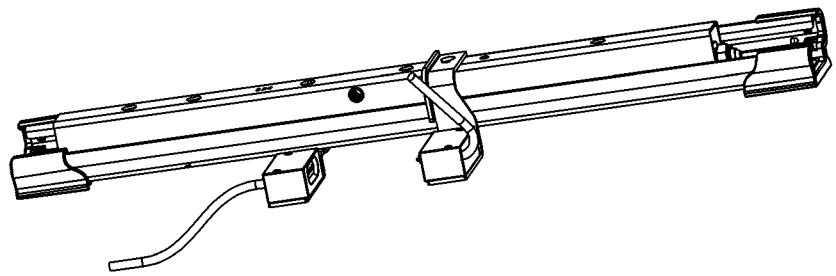
FIGS. 12A and 12B are a diagram illustrating a connection procedure for current supply through the POGO Pin according to an exemplary embodiment of the present invention.
Figure 12B:
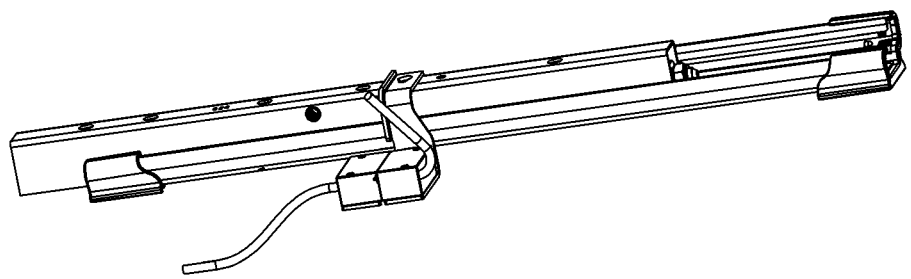

FIGS. 12A and 12B are a diagram illustrating a connection procedure for current supply through the POGO Pin according to an exemplary embodiment of the present invention.

Referring to FIGS. 12A and 12B, the POGO Pin according to an exemplary embodiment of the present invention may become in a state in shown in FIG. 12B from a state shown in FIG. 12A through seat movement, POGO Pins may be connected to each other to supply power.

According to an exemplary embodiment of the present invention, the controller 300 may determine whether a battery inside a vehicle is charged, may fully charge the battery 200 (80% charge based on a battery) by charging the battery 200 included in the seat while the battery inside the vehicle is charged, and may charge the battery 200 up to a level of 60% by charging the battery 200 while the battery inside the vehicle is not charged.

Figure 13:
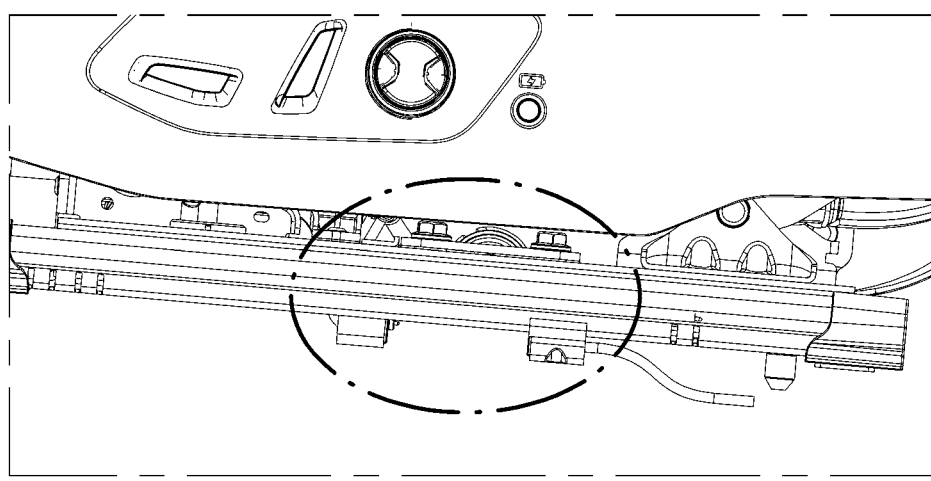
FIG. 13 is a diagram illustrating a connection procedure for current supply through the POGO Pin according to an exemplary embodiment of the present invention.

FIG. 13 is a diagram illustrating a connection procedure for current supply through the POGO Pin according to an exemplary embodiment of the present invention.

According to an exemplary embodiment of the present invention, a bracket on which a POGO Pin male is mounted may be disposed on an upper rail of a track, a bracket on which a POGO Pin female is mounted may be disposed on a lower rail of the track, and when the seat is moved to a charge position through seat sliding using the POGO Pin, POGO Pins positioned on a floor of a vehicle body and a lower track may be connected to supply power.

Figure 14:
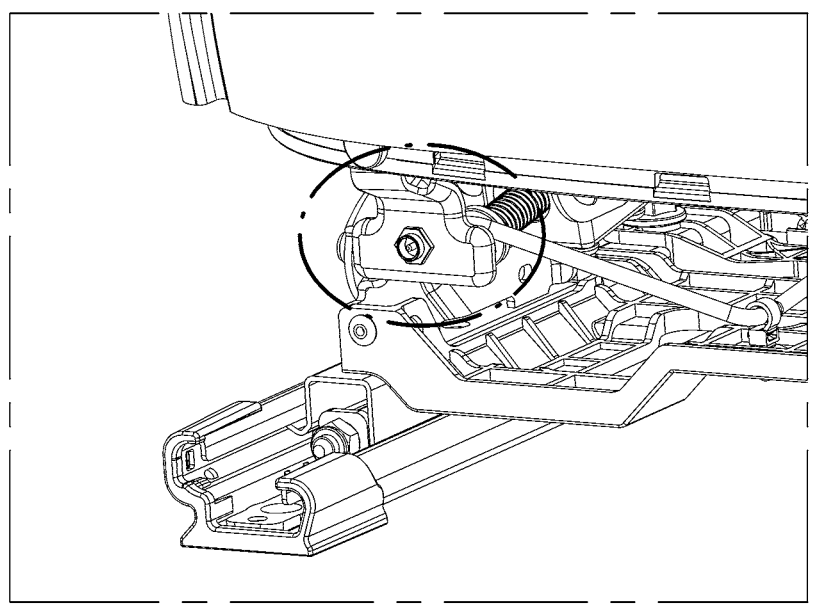
FIG. 14 is a diagram illustrating a position of an emergency charge structure shown in FIG. 2.

FIG. 14 is a diagram illustrating a position of an emergency charge structure shown in FIG. 2.

The moveable seat control apparatus with an automatically chargeable battery according to an exemplary embodiment of the present invention may further include an emergency charge structure using a cigar jack to move a seat to a charge position even when the battery is fully discharged.

The emergency charge structure according to an exemplary embodiment of the present invention may be connected to a current supply terminal connected to a battery inside a vehicle through a cigar jack to supply power to the battery.

Referring to FIG. 14, according to an exemplary embodiment of the present invention, when a user continuously utilizes a seat function without charging the battery 200 to discharge the battery 200, emergency charge may be performed using the emergency charge structure.

According to an exemplary embodiment of the present invention, a seat battery may be charged by connecting power of a cigar jack in a vehicle to a charging jack configured below a seat cushion using a separate cable. When the battery of the vehicle supplies power by moving the seat to the rearmost side during charge using power of the cigar jack, charge using the cigar jack may be stopped and the battery of the vehicle may be charged.

Figure 15:
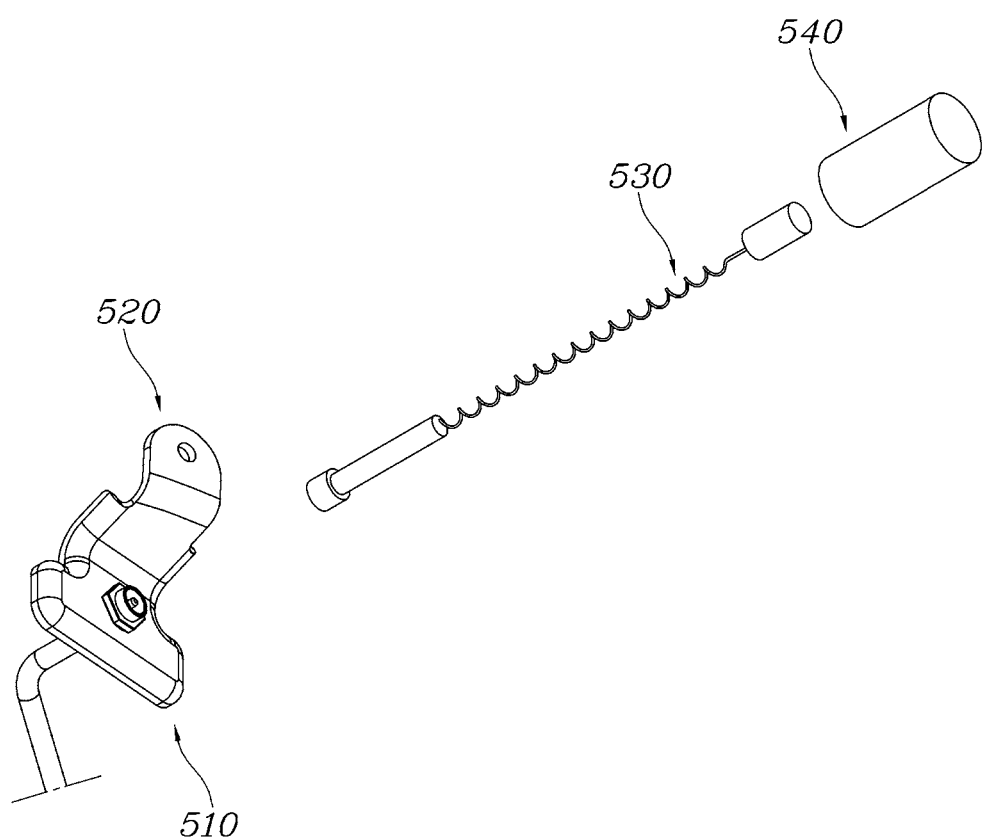
FIG. 15 is a diagram illustrating the configuration of an emergency charge structure according to an exemplary embodiment of the present invention.

FIG. 15 is a diagram illustrating the configuration of an emergency charge structure according to an exemplary embodiment of the present invention.

Referring to FIG. 15, according to an exemplary embodiment of the present invention, it may be possible to connect power of the cigar jack of the vehicle to charge the seat battery using a separate cable 530 between a charge jack 510 coupled to a mount 520 to be positioned below a seat cushion and a connection terminal 540 connected to a battery inside a vehicle.

Figure 16:
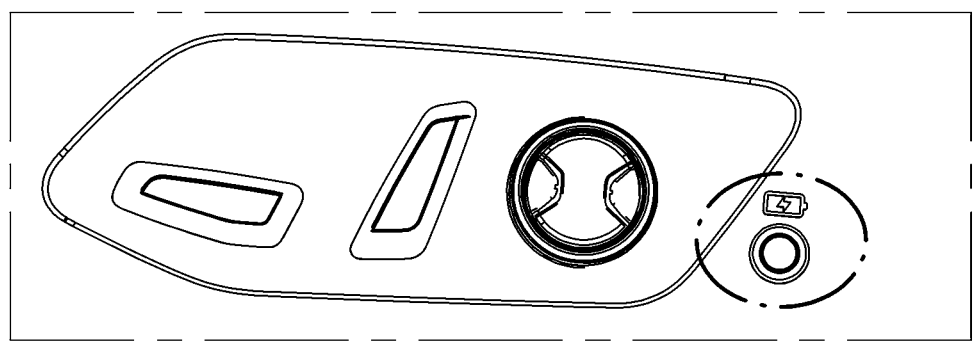
FIG. 16 is a detailed diagram illustrating the charge return switch shown in FIG. 2.

FIG. 16 is a detailed diagram illustrating the charge return switch shown in FIG. 2.

Referring to FIG. 16, the moveable seat control apparatus with an automatically chargeable battery according to an exemplary embodiment of the present invention may further include a charge return switch for controlling movement of the moving motor to move the seat to the charge position by manipulating a switching irrespective of a state of charge (SOC) value of the battery.

According to an exemplary embodiment of the present invention, when current is supplied to the battery using a cigar jack, the charge return switch may stop charging using the POGO Pin.

The drawing illustrates a connection procedure for current supply through the POGO Pin according to an exemplary embodiment of the present invention, in which case the controller 300 may monitor capacity of the battery 200, and when state of charge (SOC) value of the battery is lowered to a predetermined level or less, the battery 200 may be charged.

According to an exemplary embodiment of the present invention, when an SOC value of the battery 200 is lowered to a predetermined level or less in a state in which a passenger sits on the seat, information indicating that power of a battery is insufficient may be provided to the passenger by outputting notification or outputting the information on a display, and Accordingly, when the passenger inputs a charge command through a charge return switch or other control devices, the seat may be moved to a charge position and charge may be performed.

According to an exemplary embodiment of the present invention, when the controller 300 monitors an SOC value of the battery in real time and SOC value of the battery 200 is lowered to a predetermined level or less in a state in which a passenger does not sit on the seat, the seat may be automatically moved to a charge position and the battery 200 may be charged.

Figure 17:
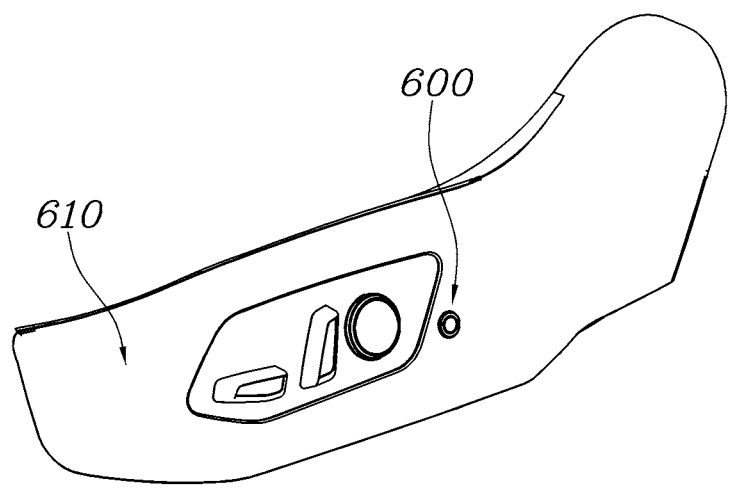
FIG. 17 is a diagram illustrating a position of the charge return switch shown in FIG. 2.

FIG. 17 is a diagram illustrating a position of the charge return switch shown in FIG. 2.

Referring to FIG. 17, the charge return switch 600 according to an exemplary embodiment of the present invention may be positioned on a lateral surface 610 of a seat.

According to an exemplary embodiment of the present invention, when a battery is disposed in a seat of a vehicle and a state of charge (SOC) value of the battery is equal to or less than a predetermined level, the seat may be moved to a charge position, and thus a space utilization degree inside the vehicle may be enhanced through extension of a region for moving the seat in an autonomous driving environment, and a convenience function (health care, an electronic device, or the like) dependent upon the seat may be provided.

According to an exemplary embodiment of the present invention, the seat may be moved to a charge position for charge, and to the present end, driving of a moving motor included in the seat may be controlled, and power required for providing various seat functions may be supplied.

Lastly, to prepare for a situation which the seat is not configured for being moved when the seat battery is discharged, a charge function using a cigar jack for emergency charge may be provided to receive emergency power.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A moveable seat control apparatus with a chargeable battery, the moveable seat control apparatus comprising:
 a seat including a moving motor engaged to the seat and configured to selectively move the seat along a rail;
 the battery positioned below the seat, and configured to receive power to perform charge, and to supply the power;
 a controller positioned below the seat and connected to the battery, and configured to monitor a state of charge value of the battery to generate a monitored state of charge value, and to control the moving motor to move the seat to a charge position when the monitored state of charge is equal to or less than a predetermined state of charge value; and
 a charger connected to the battery and coupled to a power supply terminal to receive the power and to charge the battery.

2. The moveable seat control apparatus of claim 1, wherein the controller is configured to control at least one seat function of a power seat, a lumbar, a ventilation device, or a heater.

3. The moveable seat control apparatus of claim 2, wherein the controller is configured to determine that at least one of the at least one seat function is required and provides the at least one of the at least one seat function of the power seat, the lumbar, the ventilation device, or the heater, when the monitored state of charge value is equal to or greater than a predetermined reference.

4. The moveable seat control apparatus of claim 1, wherein the controller and the battery are configured as one integrated module mounted below a cushion frame of the seat.

5. The moveable seat control apparatus of claim 4, wherein the one integrated module includes a module cover, a battery cover, the battery, a printed circuit board circuit, and at least one connector.

6. The moveable seat control apparatus of claim 5, wherein the printed circuit board circuit connected to the controller is configured to integrally control at least a seat function and to monitor capacity of the battery to determine whether to charge or use the battery.

7. The moveable seat control apparatus of claim 5, wherein the at least one connector is connected to the charger to receive the power and to supply current required for operation of at least one seat function and is configured to input or output a control signal of an electronic device function of the seat.

8. The moveable seat control apparatus of claim 4, wherein the integrated module is positioned in a predetermined space below a seat cushion, positioned below the cushion frame of the seat and above a floor of a vehicle body.

9. The moveable seat control apparatus of claim 8, wherein the integrated module is mounted in the predetermined space below the seat cushion using an integrated memory system controller mounting bracket.

10. The moveable seat control apparatus of claim 1, wherein the charger includes a charge module and a vehicle signal transmission and reception module and provides a charge function and a vehicle signal transmission and reception function.

11. The moveable seat control apparatus of claim 1, wherein the charger utilizes a 4-pin POGO Pin to be coupled to a current supply terminal and to receive current.

12. The moveable seat control apparatus of claim 11, wherein the 4-pin POGO Pin includes a POGO Pin male, a POGO Pin female, and first and second POGO brackets.

13. The moveable seat control apparatus of claim 12,
 wherein the rail includes an upper rail and a lower rail, and
 wherein the first POGO bracket on which the POGO pin male is mounted is slidably coupled on the upper rail or the lower rail, and the second POGO bracket on which the POGO pin female is mounted is slidably coupled on a remaining rail of the upper rail and the lower rail.

14. The moveable seat control apparatus of claim 13,
 wherein the POGO Pin male and the POGO Pin female are connected to supply the power when the seat is moved to the charge position through the sliding of the seat.

15. The moveable seat control apparatus of claim 11, wherein the charger supplies current to the battery through the 4-Pin POGO Pin connected to a current supply terminal connected to a battery inside a vehicle.

16. The moveable seat control apparatus of claim 1, wherein the controller is configured to control supply of power required for operation of at least a seat function.

17. The moveable seat control apparatus of claim 1, further including an emergency charge structure using a cigar jack to move the seat to the charge position when the battery is at least fully discharged.

18. The moveable seat control apparatus of claim 17, wherein the power is supplied to the battery by connecting the battery to the power supply terminal connected to the battery inside the vehicle through the cigar jack.

19. The moveable seat control apparatus of claim 18, wherein, when current is supplied to the battery through the cigar jack, charge through a POGO Pin is stopped.

20. The moveable seat control apparatus of claim 1, further including a charge return switch configured to manipulate a switch irrespective of the state of charge value of the battery and to control the moving motor to move the seat to the charge position.

* * * * *